Patented May 31, 1927.

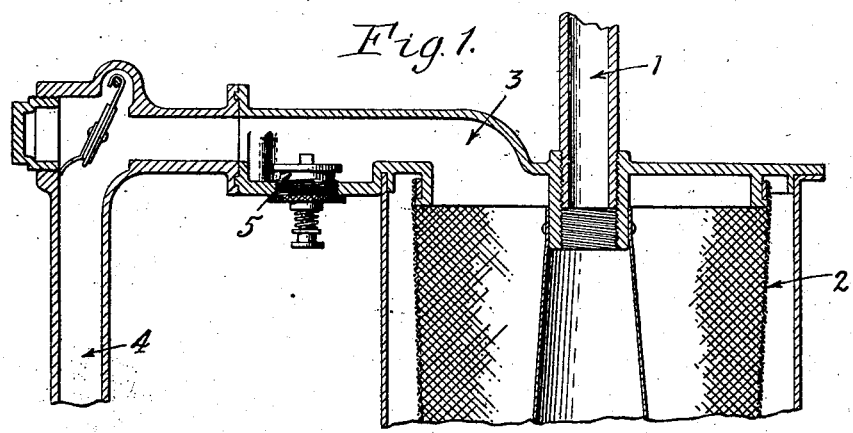
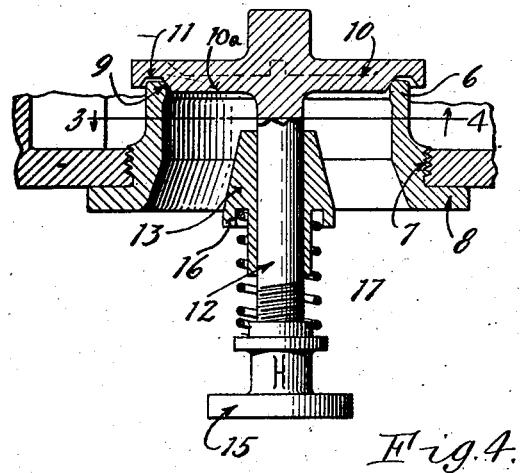
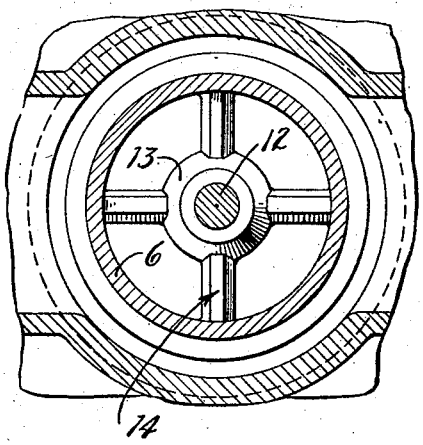
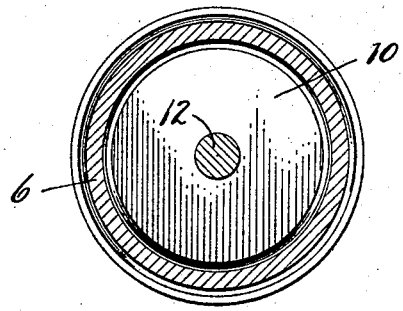

1,630,362

UNITED STATES PATENT OFFICE.

WILLIAM S. SUTTON, OF ROCKFORD, ILLINOIS, ASSIGNOR TO AMERICAN RADIATOR COMPANY, OF CHICAGO, ILLINOIS, A CORPORATION OF NEW JERSEY.

VALVE.

Application filed April 16, 1921. Serial No. 461,770.

My invention relates to improvements in valves and particularly to that class of valve designed as relief valves for vacuum cleaning devices.

In certain types of vacuum cleaning devices it is necessary to provide a relief valve in the device preferably between the dust separator and the pump in order to admit air to the pump in the event some or all of the nozzle connections are closed while the pump is being run.

My valve is particularly designed to operate as a relief valve in such apparatus.

For the purpose of disclosing my invention I have illustrated one embodiment thereof in the accompanying drawing in which:

Figure 1 is a partial sectional view of a vacuum cleaning device showing my relief valve in position;

Fig. 2 is a sectional view of my relief valve;

Fig. 3 is a sectional view taken on the line 3—4 of Fig. 2 looking downwardly, and Fig. 4 is a sectional view taken on said line 3—4 of Fig. 2, looking upwardly.

In the embodiment of the invention illustrated the pipe 1 extends from the nozzle connections of the apparatus into the dust separator 2. Leading from the dust separator is a conduit 3 which connects by the pipe 4 with the vacuum producing pump not shown. The relief valve 5 is placed in the conduit 3 so that in event the nozzle connections or outlets in the system are closed air will be admitted into the pipes 3 and 4 to thereby prevent an undue load being imposed upon the driving motor for the pump. It is obvious that as long as the pump is sucking air through the parts 1, 2, 3 and 4 air must be supplied to these conduits as otherwise too great a load would be imposed upon the motor driving the pump. Ordinarily with the nozzle openings of the apparatus open, air passes therethrough. It frequently happens that these openings are closed or nearly closed. Under such conditions the relief valve 5 opens to permit the air to pass therethrough which prevents too great a load being placed on the electric motor.

My valve is designed to open with a minimum excess of load upon the motor. As shown in the construction illustrated I provide an annular casing 6 having a screw-threaded shoulder 7 formed on the outer periphery thereof to engage in the screw-threads of an opening in the pipe 3. This casing is also provided with an annular flange 8 adapted to seat against the pipe. The said casing is also provided at its outer end with an outwardly flared entrance portion, and at its inner end with a beveled portion 9 to provide a seat for the valve disc 10 having a reacting surface in the form of an annular groove 11 formed in the under surface of the disc. The annular groove 11 is provided with a downwardly and outwardly inclined outer wall portion, a downwardly and inwardly inclined inner wall portion, and a horizontal intermediate wall portion. The downwardly and inwardly inclined wall portion is of greater width or depth than said downwardly and outwardly inclined outer wall portion owing to the fact that a part of said inwardly and downwardly extending inner wall portion is formed upon the edge of a central raised portion 10ª provided upon the under side of the valve disc 10. The seat engages a part of the surface of this groove in such a manner that the air when passing through the valve impacts on the entrance side and reacts on the exit side of the groove causing the disc to lift easily from its seat.

The disc 10 is provided with a stem 12 passing through the inwardly tapering hub 13 of a spider 14 integrally formed with the casing 6. The lower end of the valve is provided with an adjustable nut 15 adapted to make screw-threaded engagement with the stem and retain between it and a shoulder 16 on the hub 13 a coil spring 17 which tends to maintain the valve in closed position. The nut 15 being adjustable on the stem provides means whereby the tension of the spring may be varied to vary the extent of vacuum which must be produced in the pipe 3 before the valve will be opened.

Due to the construction of the seat and surface of the valve I have provided means whereby the difference in the load imposed upon the motor to open the valve partially or completely, is negligible. I have found that in relief valves as heretofore constructed for this purpose, while the valve may be set to open at a pre-determined partial vacuum which imposes a predetermined load upon the motor, in order to completely open the valve to admit a greater amount of air to the conduit a load is imposed on the motor to such an extent that there is danger of the motor burning out. I have found that the valve of my invention imposes no appreciable load upon the motor for opening the valve to its fullest extent over that required to partially open the valve.

Having thus described my invention, what I claim as new and desire to secure by Letters Patent is:

1. A valve of the character described comprising a casing having an internal annular wall terminating at the outlet end in a valve seat; a valve disk having an enlarged central portion at its inner side and an annular groove adjacent its periphery; said groove having a relatively wide inwardly inclined wall constituting the periphery of said enlarged central portion, a narrow outwardly-inclined outer wall portion and a horizontal intermediate wall portion, an intermediate portion of said inwardly-inclined wall adapted to engage said valve seat when the valve is closed; said annular groove serving to receive the adjacent end of said annular casing, the outer and intermediate wall portions of said groove lying about and in normally spaced relation to the adjacent outer portion of said annular casing to provide a passage therebetween, said inwardly-inclined wall projecting within said casing when the valve is seated to provide a wedge-like annular space between said enlarged central portion of the valve disk and the adjacent portion of the internal annular wall of the casing below the valve seat whereby, when said valve is actuated, to cause the fluid to instantly pass through said passage and react upon the walls thereof and upon the valve seat to unseat and maintain said valve disk unseated, substantially as specified.

2. A valve of the character described comprising a casing having an outwardly flaring entrance portion at one end and an inner beveled portion at the opposite end constituting a valve seat, an inwardly tapering hub carried by said casing within the entrance portion thereof, a valve disc having an enlarged central portion at its inner side, a stem extending therefrom and slidably engaging said hub; said valve disc being provided with an annular groove adjacent to its periphery having a relatively wide inwardly-inclined inner wall portion adapted to engage said valve seat, a narrow outwardly-inclined outer wall portion and a horizontal intermediate wall portion; the outer and intermediate wall portions of said groove being arranged in spaced relation to the adjacent outer portions of said casing to provide a passage therebetween and serving, when said valve is actuated, to cause the fluid to instantly pass through said passage and react upon the walls thereof to unseat and maintain said valve disc unseated, a valve spring for normally maintaining said valve disc in seated position, and means for controlling the tension of said spring, substantially as specified.

In witness whereof, I have hereunto subscribed my name.

WILLIAM S. SUTTON.